United States Patent [19]
Tsukagoshi et al.

[11] Patent Number: 5,144,417
[45] Date of Patent: Sep. 1, 1992

[54] PROJECTION TYPE TELEVISION APPARATUS

[75] Inventors: Kazuo Tsukagoshi; Hiroshi Tetsuda; Hiroshi Kawamura, all of Nagaokakyo, all of Japan

[73] Assignee: Mitsubishi Denki Kabushiki Kaisha, Tokyo, Japan

[21] Appl. No.: 631,151

[22] Filed: Dec. 20, 1990

[30] Foreign Application Priority Data

Dec. 26, 1989 [JP] Japan .................................. 1-341432

[51] Int. Cl.$^5$ ............................................ H04N 9/14
[52] U.S. Cl. ........................................ 358/60; 358/64; 358/253; 313/474; 313/112; 359/722; 359/589
[58] Field of Search ................... 358/60, 64, 250, 237, 358/252, 253, 231; 313/474, 112; 350/438, 166, 167; 353/84

[56] References Cited

U.S. PATENT DOCUMENTS

| | | |
|---|---|---|
| 4,634,926 | 1/1987 | Vriens et al. . |
| 4,679,069 | 7/1987 | Andren et al. ........................ 358/60 |
| 4,683,398 | 7/1987 | Vriens et al. . |
| 4,804,884 | 2/1989 | Vriens et al. . |
| 4,987,483 | 1/1991 | Tsukagoshi et al. ................... 358/64 |

FOREIGN PATENT DOCUMENTS

| | | |
|---|---|---|
| 61-39349 | 2/1986 | Japan . |
| 61-273837 | 12/1986 | Japan . |
| 63-157597 | 6/1988 | Japan . |

*Primary Examiner*—James J. Groody
*Assistant Examiner*—Michael H. Lee

[57] ABSTRACT

In a projection type television apparatus, a first and a second color selecting device are located on an optical light path passing through a cathode ray tube and a series of projection lenses are disposed in front of the cathode ray tube without a color selecting device therein. The first color selecting device has a high refractive factor to light having a wavelength of 570nm or more and the second color selecting device has a high reflection factor or a high absorption factor to light having a wavelength of 520nm or less. With this color selecting device, the range of color reproduction can be much more improved. This thus causes an increased degree of color purity of green light at the central and peripheral areas of the cathode ray tube. Moreover, with this arrangement, it becomes easy to conserve the characteristic of the color selecting devices and to facilitate the manufacturing operation.

22 Claims, 5 Drawing Sheets

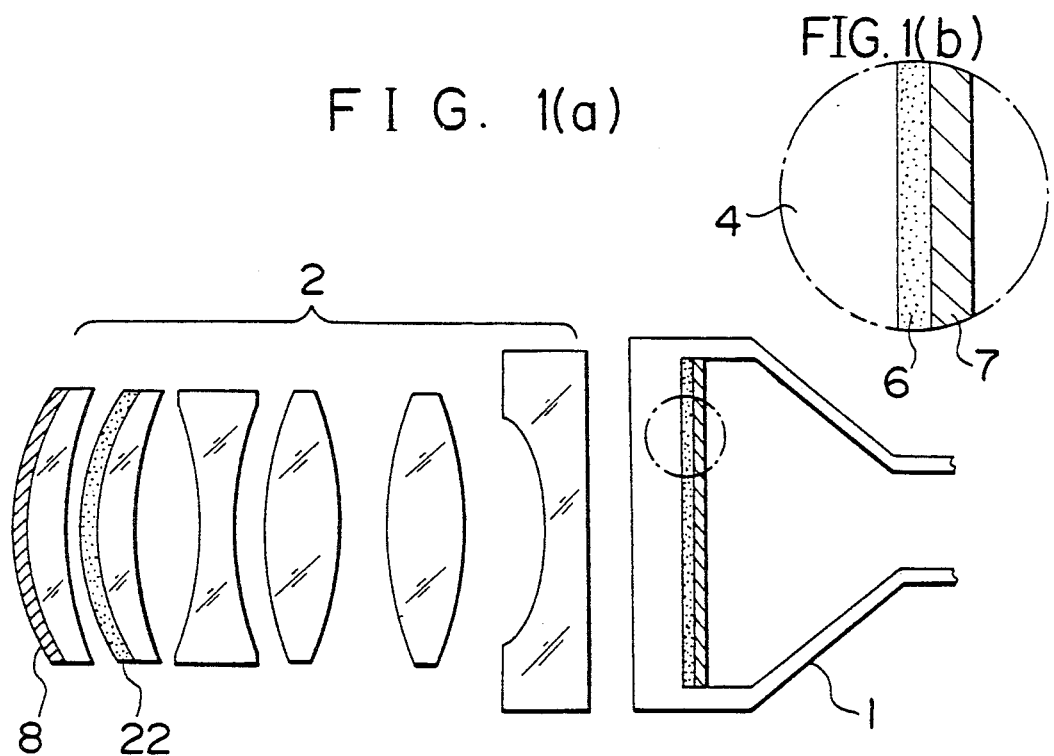
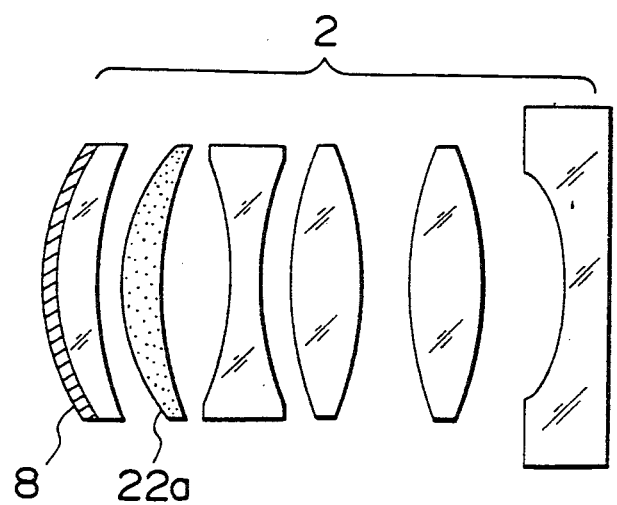

FIG. 7
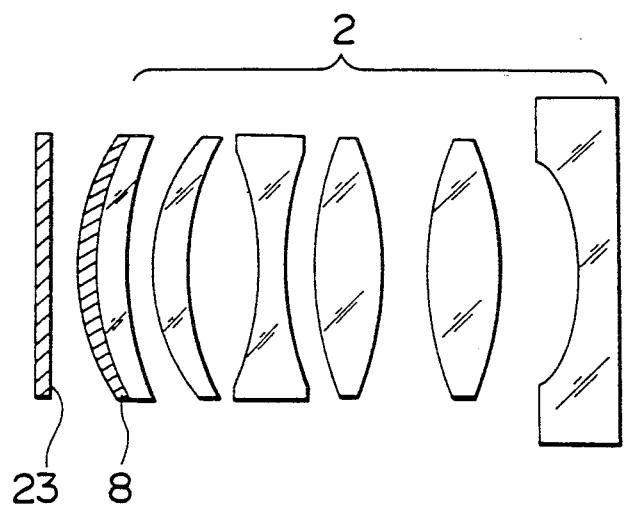
FIG. 8(a) PRIOR ART
FIG. 8(b) PRIOR ART
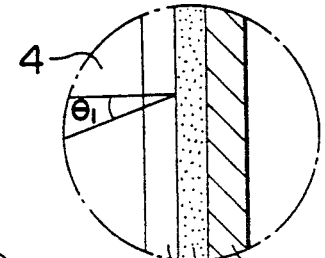
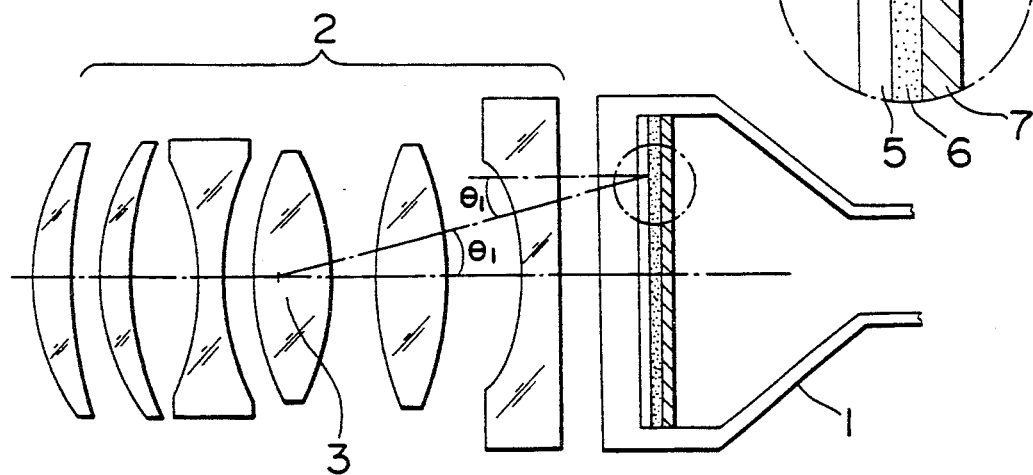

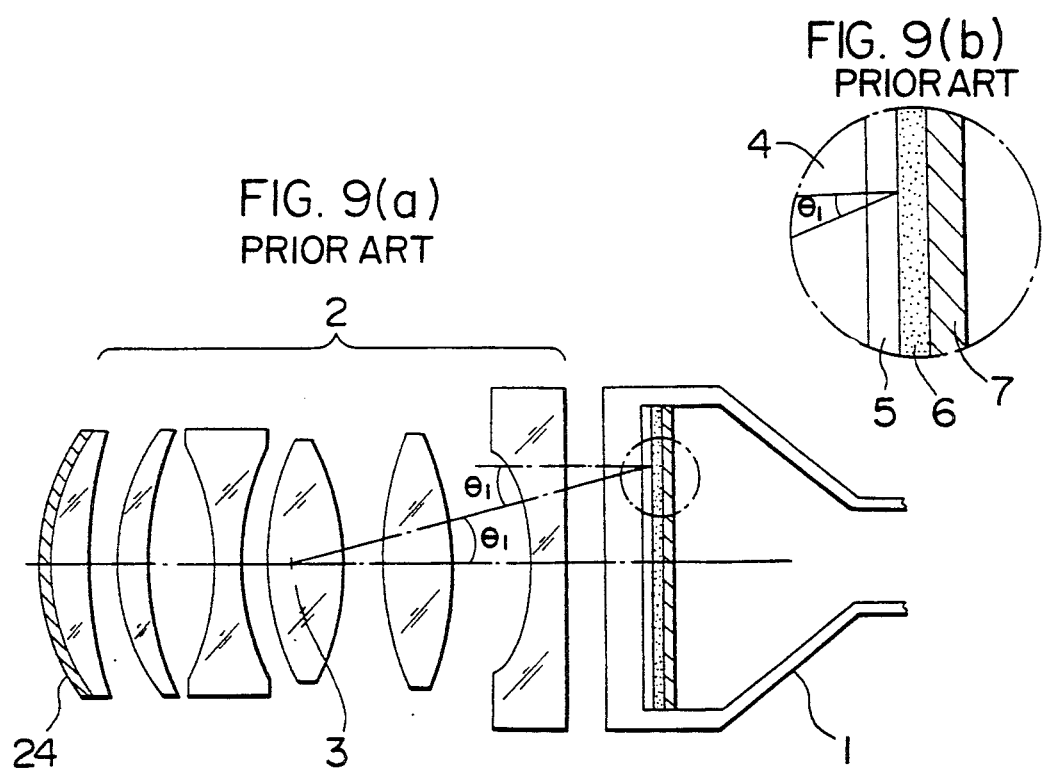

PROJECTION TYPE TELEVISION APPARATUS

BACKGROUND OF THE INVENTION

1. Field of the Invention

This invention relates to a projection type television apparatus using a green cathode ray tube having an improved color reproduction characteristic.

2. Description of the Related Art

FIG. 8(a), (b) of the accompanying drawings are diagrams showing a structure of a projection lens unit for a cathode ray tube, equipped with a multilayered interference filter is employed in a conventional projection type television apparatus. As shown in FIG. 8(a), (b) the projection television apparatus comprises a cathode ray tube 1 and a series of projection lenses 2 located in front of the cathode ray tube 1. A reference numeral 3 designates an incident pupil position of the series of projection lenses 2; 4, a display face plate pane; 5, a multilayered interference filter; 6, a fluorescent material; and 7, a vacuum evaporation aluminum film.

The operation of this conventional projection television apparatus will now be described.

When electron beams are incident on a fluorescent material 6 coated on the cathode ray tube 1, the fluorescent material 6 shows a characteristic curve 9 of a luminous spectrum of a multilayered interference coating with respect to transmittivity shown in FIG. 5. In view of the life and brightness, any existing cathode ray tube to be used in a projection television apparatus has inevitably such a spectrum. As shown in FIG. 5, the green fluorescent material 6 includes a spectrum blue-side and red-side spectra in addition to an essential green spectral wavelength 545 nm. Therefore, as shown in a chromaticity diagram of FIG. 6, only the chromaticity value at a point $G_016$ remote from the standard green chromaticity point G13 can be obtained. Consequently, color reproduction is possible only within a triangular range 19 indicated by broken lines.

To this end, it is a known practice to place between the face plate pane 4 and the fluorescent material 6 a multilayered interference filter 5 composed of a plurality of alternately superimposed layers of high and low refractive index materials, and then to determine the transmittivity characteristic of this multilayered interference filter as indicated by the broken lines 11 shown in FIG. 5. Thus, unnecessary light spectrum having peak values around 600 nm of the light spectrum emitted from the green fluorescent material 6 is reflected. Therefore it is possible to improve the color reproduction up to the chromaticity point $G_117$ shown in FIG. 6. However, since the transmittivity characteristic of the interference filter 5 is determined as indicated by the broken lines 11 of FIG. 5, it is impossible to reflect unnecessary light spectrum having a peak at a wavelength of a slightly less than 500 nm. As a result, color reproduction is yet possible in the triangular range 20 indicated by the dash-and-one-dot lines in FIG. 6.

Since the image on the cathode ray tube 1 is disposed at an angle of $\theta_1$ with respect to the incident pupil 3 which is at the center of the projection lens series 2 as shown in FIG. 8(a), the difference l in the optical path between the layers of the multilayered interference filter 5 can be expressed by the following equation:

$$l = 2d \cos \theta_1 \quad (d: \text{layer thickness})$$

Consequently, the transmittivity characteristic of, in the direction of angle $\theta_1$, the multilayered interference filter 5 will be as indicated by the dash-and-one-dot lines 12 in FIG. 5. This causes even the necessary green light spectrum to be reflected, thus impairing the color reproduction range.

Prior to this application, the applicant herein proposed a projection type television having the color reproduction and the purity of green highly improved by interposing the multilayered interference coating layer 23 having a high reflective index to light having a wavelength of 520 nm or less as shown in FIG. 9(a), (b) in the green projection lens series located in front of the cathode ray tube.

As described above, with this conventional arrangement, partly because the range of color reproduction is inadequate for light from the central areas of the cathode ray tube, and partly because light from the peripheral areas of the cathode ray tube is reflected up to the essential light spectrum, the display color would become blue-emphasized green.

In connection with the above-mentioned existing projection television set and the improved projection television proposed by the applicant herein, there are still several disadvantages in the process of forming the aforementioned multilayered interference coating layer on the inner surface of the cathode ray tube with respect to the characteristic of the coating layer.

Specifically, as it will be explained later, since the multilayered interference coating layer is composed of 10 to 20 vacuum evaporation film of oxide titanium or oxide silicon, it is not an easy operation to form the vacuum evaporation film on the inner surface of the cathode ray tube having a cylindrical structure with a bottom.

Further, as the matter of course, in the cathode ray tube, a consideration is necessary for the high level withstand characteristic against X ray and electron beams.

As another consideration, a highly strict requirement of a high chemical resistance is also necessary when a fluorescent material is interposed between the multilayered interference coating layer and the vacuum evaporation aluminum film.

Accordingly, this invention is made to solve the above-described drawbacks of the existing projection type television, and an object of the present invention is to provide a projection type television apparatus which is capable of improving the color purity at the central and the periphery of the green cathode ray tube, whether or not the cathode ray tube has a multilayered interference filter interposed between the face plate pane and the fluorescent material.

SUMMARY OF THE INVENTION

To this end, in one aspect of the present invention, there is provided a projection type television apparatus comprising: a cathode ray tube having a face plate pane; a display screen of a fluorescent material layer disposed on an inner surface of the face plate pane; a series of projection lenses located in front of the display screen of the cathode ray tube; a first color selecting means disposed on an optical light path composed of the series of the projection lenses and a cathode ray tube and having a high refractive factor to light having a wavelength of 570 nm or more; and a second color selecting means disposed in the optical light path composed of the series of the projection lenses and the cathode ray tube and having a high reflection factor or a high absorption factor to light having a wavelength of 520 nm or more.

Practically, a first color selecting device may be of a multilayered coating formed on a front surface of the foremost one of the series of projection lenses, and a second color selecting device may be any of: a multilayered interference coating formed over a front surface of the second foremost one of the series of green projection lenses, or a multilayered interference filter disposed in front of the second foremost one of green projection lenses; a lens colored by mixing therein a metallic material, a pigment and a dye, or by soaking in a coloring liquid to cause infiltration of the liquid to the surface of the lens; a coolant interposed between the cathode ray tube and the series of green projection lenses and colored by mixing in the coolant a pigment or a dye; or a filter disposed in front of the foremost one of the series of green projection lenses.

Specifically, the first color selecting device is a multilayered interference filter having a high refractive factor to light having the wavelength of 570 nm or more and formed on the foremost one selected from the series of green projection lenses by a known manufacturing method. Since the required operation is an operation of evaporating glass lenses, there is quite few problems in the manufacturing process. Further, and it is also preferable to conserve the characteristic of the multilayered interference filter liable to be deteriorated by the processing.

In addition, as the second color selecting device having a high reflection factor or a high absorption factor to light having a wavelength of 520 nm or less, any of a multilayered interference coating layer formed over a lens, made of a glass or a plastic, other than that for the first color selecting device in the series of projection lens; a filter; or a glass or a plastic lens having the same color selective characteristic as that of the multilayered interference layer and colored by mixing metal therein, a pigment, or dye, may be used.

Furthermore, the second color selecting device can be made up of any of a plastic lens colored by soaking in a coloring liquid to cause infiltration of the liquid to the surface of the lens; or a coolant interposed between the cathode ray tube and the series of lenses and colored by mixing therein a pigment or a dye.

With this arrangement, since a first color selecting device has a high refractive index to light having a wavelength of 570 nm or more and a second color selecting device has a high reflection factor or a high absorption factor to light having a wavelength of 520 nm or less, it becomes possible to adequately reflect or absorb all the unnecessary light emitted from the green cathode ray tube, thereby reproducing a necessary light.

Furthermore, since both the above-described first and second color selecting device are disposed in the series of lenses, this arrangement is advantageous for conserving a characteristic of a color selecting device and greatly facilitates the manufacturing operation.

The above and other advantages, features and additional objects of this invention will be manifest to those versed in the art upon making reference to the following detailed description and the accompanying drawings in which several structural embodiments incorporating the principles of this invention are shown by way of illustrative examples.

BRIEF DESCRIPTION OF THE DRAWINGS

FIGS. 1a and 1b are diagrams showing the structure of a cathode ray tube and a series of projection lenses of a projection type television apparatus in accordance with a first embodiment of the present invention;

FIGS. 2 through 4 are diagrams showing the structure of a lens unit in accordance with other embodiments of the present invention;

FIG. 7 is a diagram showing the structure of a series of projection lenses in accordance with another embodiment of this invention;

FIGS. 8a, 8b, 9a, 9b are diagrams showing the structure of cathode ray tubes and projection lenses in accordance with a conventional projection television apparatus and a projection television apparatus disclosed in the copending application of the applicant therein.

DETAILED DESCRIPTION OF THE PREFERRED EMBODIMENTS

Figure 3:
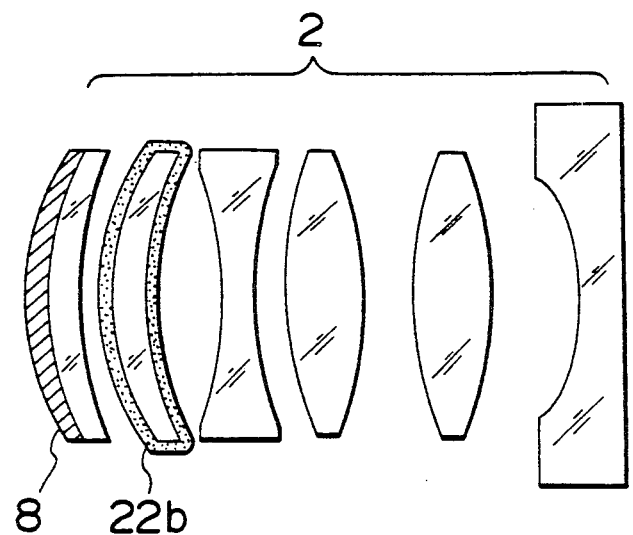

A first embodiment in accordance with this invention will now be described with reference to the accompanying drawings hereinbelow. FIG. 1(a) is a diagram showing a structure of a series of projection lenses using a cathode ray tube of a projection television apparatus embodying the present invention. Since reference numerals from 1 to 7 designate the parts given the same numerals in a series of projection lenses of a conventional cathode ray tube shown in FIG. 8(a), the explanation of these parts are omitted here for clarity.

A reference numeral 8 designates a first color selecting device having a high refractive index to light having a wavelength of 570 nm or more and formed over the surface of a foremost glass lens of a series of projection lenses 2, namely a multilayered interference coating layer which is evaporated by a known method. A reference 22 designates a multilayered interference coating layer or filter embodying a second color selecting device formed on one of the other projection lenses 2, and, like the transmittivity characteristic 10 indicated by the dash-and-two-dot lines of FIG. 5, the multilayered interference coating layer or filter has a high reflection factor or a high absorption factor to light having a wavelength of around 520 nm. The above-mentioned multilayered interference coating 22 includes a vacuum evaporation film composed of a plurality of (about 10 to 20) alternately superimposed layers of high and low refractive indices. The high-refractive-index layers comprise titanium oxide ($TiO_2$) or tantalum oxide ($Ta_2O_5$), and the low-refractive-index layers include silicon oxide ($SiO_2$) or magnesium fluoride ($MgF_2$), for example.

Figure 5:
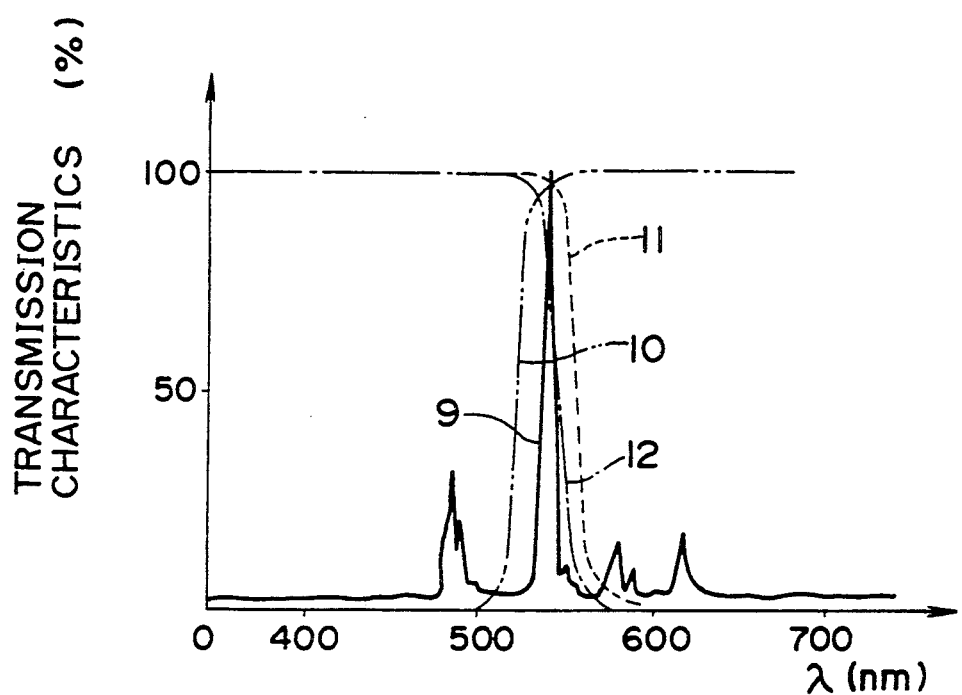
FIG. 5 is a graph showing the luminous spectrum of a green cathode ray tube and the transmittivity characteristic of a multilayered interference coating or filter.
Figure 6:
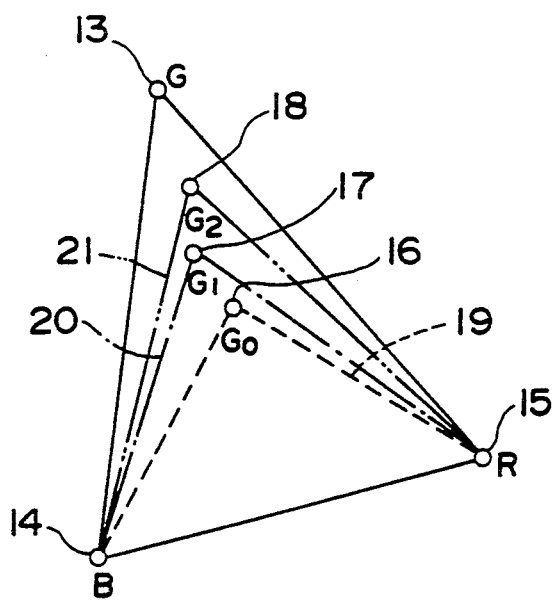
FIG. 6 is a chromaticity diagram showing a color reproduction range.

In operation, when electron beams are incident on the fluorescent material 6 of the cathode ray tube 1 of the projection television apparatus with the above-described structure, the light spectrum indicated by the solid lines in FIG. 5 is radiated. Because of the transmittivity characteristic 11 of the multilayered interference filter 8 formed on a front surface of the foremost lens, light having peaks near 600 nm is reflected. In the meantime, unnecessary light having peaks at a wavelength of slightly shorter than 500 nm is not emitted from the series of projection lens 2. In other words, since the multilayered interference coating or filter 22 formed on the front surface of the other one of the projection lenses 2 is determined so as to have the transmittivity characteristic 10 indicated by the dash-and-two-dot lines of FIG. 5, light having a wavelength of 520 nm or less is reflected and is not emitted forwardly out of the series of projection lenses 2. More specifically, unnecessary partial light of the light emitted from the cathode ray tube 1 is not emitted forwardly and therefore not projected on a screen by being reflected or absorbed by means of the multilayered interference coating and layer 8, 22 interposed among the projection lenses 2. As a result, it becomes possible to improve the chromaticity point up to the point $G_218$ in FIG. 6. Consequently, the color reproduction range can be expanded up to a triangular area indicated by the dash-and-two-dot lines 21 in FIG. 6. Regarding light of an image on the peripheral areas of the cathode ray tube 1, because light having a wavelength between 520 nm or less and 570 nm or more is not forwardly emitted, all light obtained is only light having a peak wavelength around 545 nm, which is the essential green spectrum, thereby reproducing only green color. This would improve the color purity at the central areas as well as at the peripheral areas with respect to the single green light.

Next, in accordance with this invention, as the second color selecting device, instead of the above-stated multilayered interference coating layer 22, there may be used a glass or a plastic lens 22a colored by mixing therein a metallic material, a pigment and a dye in order to have a transmittivity characteristic of reflecting or absorbing light having a wave length of 520 nm or less as shown in FIG. 2.

Alternatively, the colored lens 22a can be a plastic lens 22b having the same level of color selectivity characteristic and colored by soaking in a coloring liquid to cause infiltration of the liquid to the surface of the lens as shown in FIG. 3.

Figure 4:
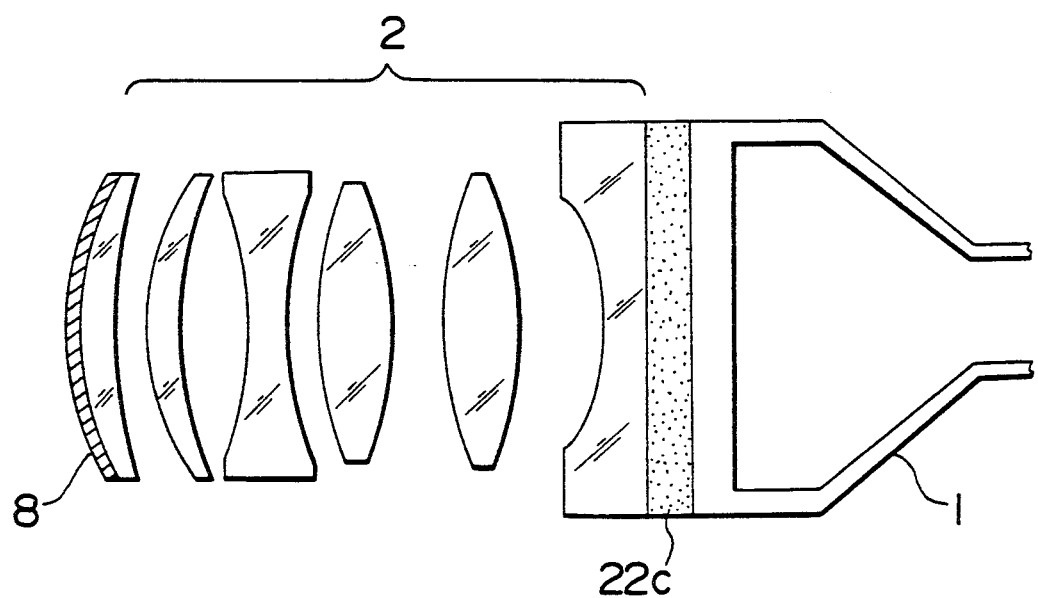

In another alternative form, as shown in FIG. 4, the second color selecting device may be a coolant 22c interposed between the cathode ray tube and the series of green projection lenses and colored by mixing in the coolant a pigment or a dye to have the same characteristic.

As a coloring agent for the glass lens, iron oxide or chromium oxide is usually used. For the plastic lens and the coolant, phthalocyanine pigments or anthraquinone pigments are used as needed.

In a further alternative form, as shown in FIG. 7, the second color selecting device may be a filter 23 having a high refractive index to light having a wavelength of around 520 nm and disposed in front of the series of projection lenses 2 instead of the multilayered interference coating layer 22, providing the similar advantage as mentioned above.

As has been explained above, in accordance with the present invention, because the first and second color selecting devices, having an absorption factor or a high reflection factor to light having a wavelength between 570 nm or more and 520 nm or less, are located among the series of projection lenses arranged in front of the cathode ray tube, the color reproduction can be much more improved. Furthermore, although the cathode ray tube is equipped with the multilayered interference filter, it is possible to improve the color purity of green light at the central and peripheral areas of the cathode ray tube.

Additionally, since both the first and second color selecting device mentioned-above are disposed among the series of lenses which are located outside of the cathode ray tube, it becomes advantageous for conserving a characteristic, and greatly facilitates the operation of manufacturing the selecting device.

What is claimed is:

1. A projection type television apparatus comprising:
   (a) a cathode ray tube including a face plate panel and a display screen of a fluorescent material layer disposed on an inner surface of the face plate panel;
   (b) a series of green projection lenses arranged in front of the display screen of the cathode ray tube;
   (c) a first color selecting means, disposed in a predetermined position of an optical light path passing through said series of green projection lenses and said cathode ray tube, said first color selecting means having a high refractive factor to light having a wavelength of at least 570 nm, for refracting light having a wavelength above 570 nm; and
   (d) a second color selecting means disposed in a second predetermined position, different from said first predetermined position, of said optical light path passing through said series of green projection lenses and said cathode ray tube and having at least one of a high reflection factor and a high absorption factor to light having a wavelength of at most 520 nm, for performing at least one of reflecting and absorbing of light having a wavelength below 520 nm, wherein said second color selecting means is a glass lens colored by mixing therein a coloring agent including at least one of a metallic material, a pigment, and a dye in order to create a transmittivity characteristic to perform at least one of reflection and absorption of light having a wavelength of at most 520 nm.

2. A projection type television apparatus according to claim 1, wherein said coloring agent includes iron oxide.

3. A projection type television apparatus according to claim 1, wherein said coloring agent includes a phthalocyanine compound.

4. A projection type television apparatus according to claim 1 wherein said first color selecting means is a multilayered coating formed on a foremost one of said series of green projection lenses and is composed of a plurality of alternately superimposed high and low refractive index materials.

5. A projection type television apparatus according to claim 1, wherein said first color selecting means is a glass lens covered with a multilayered interference coating composed of a plurality of alternately superimposed high and low refractive index materials.

6. A projection type television apparatus according to claim 5, wherein said multilayered interference coating is a vacuum evaporation film composed of 10 to 20 layers, of which said high refractive index material includes one of titanium oxide and tantalum oxide and said low refractive index material includes one of silicon oxide and magnesium oxide.

7. A projection type television apparatus comprising:
   (a) a cathode ray tube including a face plate pane and a display screen of a fluorescent material layer disposed on an inner surface of the face plate plane;
   (b) a series of green projection lenses arranged in front of the display screen of the cathode ray tube;
   (c) a first color selecting means, disposed in a predetermined position of an optical light path passing through said series of green projection lenses and said cathode ray tube, said first color selecting means having a high refractive factor to light having a wavelength of at least 570 nm, for refracting light having a wavelength above 570 nm; and (d) a second color selecting means, disposed in a second predetermined position, different from said first predetermined position, of said optical light path passing through said series of green projection lenses and said cathode ray tube and having at least one of a high reflection factor and a high absorption factor to light having a wavelength of at most 520 nm, for performing at least one of reflecting and absorbing of light having a wavelength below 520 nm, wherein said second color selecting means is a plastic lens colored by soaking in a coloring liquid to cause infiltration of the coloring liquid to a surface of said plastic lens in order to obtain a transmittivity characteristic to perform at least one of reflection and absorption of light having a wavelength of at most 520 nm.

8. A projection type television apparatus according to claim 7, wherein said coloring liquid includes chromium oxide.

9. A projection type television apparatus according to claim 7, wherein said coloring agent includes an anthraquinone compound.

10. A projection type television apparatus according to claim 7, wherein said first color selecting means is a multilayered coating formed on a foremost one of said series of green projection lenses and composed of a plurality of alternately superimposed high and low refractive index materials.

11. A projection type television apparatus according to claim 7, wherein said first color selecting means is a glass lens covered with multilayered interference coating composed of a plurality of alternately superimposed high and low refractive index materials.

12. A projection type television apparatus according to claim 11, wherein said multilayered interference coating is a vacuum evaporation film composed of 10 to 20 layers, of which said high refractive index material includes one of titanium oxide and tantalum oxide and said low refractive index material includes one of silicon oxide and magnesium oxide.

13. A projection type television apparatus comprising:

(a) a cathode ray tube including a face plate pane and a display screen of a fluorescent material layer disposed on an inner surface of the face plate pane;

(b) a series of green projector lenses arranged in front of the display screen of the cathode ray tube;

(c) a first color selecting means, disposed in a predetermined position of an optical light path passing through said series of green projection lenses and said cathode ray tube, said first color selecting means having a high refractive factor to light having a wavelength of at least 570 nm, for refracting light having a wavelength above 570 nm; and (d) a second color selecting means, disposed in a second predetermined position, different from said first predetermined position, of said optical light path passing through said series of green projection lenses and said cathode ray tube and having at least one of a high reflection factor and a high absorption factor to light having a wavelength of at most 520 nm, for performing at least one of reflecting and absorbing of light having a wavelength below 520 nm, wherein said second color selecting means is a liquid coolant colored by mixing a pigment therein and is disposed between said series of green projection lenses and said cathode ray tube.

14. A projection type television apparatus according to claim 13, wherein said pigment for coloring includes a phthalocyanine compound.

15. A projection type television apparatus according to claim 13, wherein said pigment for coloring includes a anthraquinone compound.

16. A projection type television apparatus according to claim 13, wherein said first color selecting means is a multilayered coating formed on a foremost one of said series of green projection lenses and composed of a plurality of alternately superimposed high and low refractive index materials.

17. A projection type television apparatus according to claim 13, wherein said first color selecting means is a glass lens covered with a multilayered interference coating composed of a plurality of alternately superimposed high and low refractive index materials.

18. A projection type television apparatus according to claim 17, wherein said multilayered interference coating is a vacuum evaporation film composed of 10 to 20 layers, of which said high refractive index material includes one of titanium oxide and tantalum oxide and said low refractive index material includes one of silicon oxide and magnesium oxide.

19. A projection type television apparatus comprising:

(a) a cathode ray tube including a face plate pane and a display screen of a fluorescent material layer disposed on an inner surface of the face plate pane;

(b) a series of green projection lenses arranged in front of the display screen of the cathode ray tube;

(c) a first color selecting means, disposed in a predetermined position of an optical light path passing through said series of green projection lenses and said cathode ray tube, said first color selecting means having a high refractive factor to light having a wavelength of at least 570 nm, for refracting light having a wavelength above 570 nm; and (d) a second color selecting means, disposed in a second predetermined position, different from said first predetermined position, of said optical light path passing through said series of green projection lenses and said cathode ray tube and having at least one of a high reflection factor and a high absorption factor to light having a wavelength of at most 520 nm, for performing at least one of reflecting and absorbing of light having a wavelength below 520 nm, wherein said second color selecting means is a filter disposed in front of said first color selecting means and has at least one of a high reflection and a high absorption factor to light having a wavelength of at most 520 nm.

20. A projection type television apparatus according to claim 19, wherein said first color selecting means is a multilayered coating formed on a foremost one of said series of green projection lenses and composed of a plurality of alternately superimposed high and low refractive index materials.

21. A projection type television apparatus according to claim 19, wherein said first color selecting means is a glass lens covered with a multilayered interference coating composed of a plurality of alternately superimposed high and low refractive index materials.

22. A projection type television apparatus according to claim 21, wherein said multilayered interference coating is a vacuum evaporation film composed of 10 to 20 layers, of which said high refractive index material includes one of titanium oxide and tantalum oxide and said low refractive index material includes one of silicon oxide and magnesium oxide.

* * * * *